United States Patent [19]

Shurtleff

[11] Patent Number: 6,032,376
[45] Date of Patent: Mar. 7, 2000

[54] PENDULUM LINE LEVEL

[76] Inventor: William K. Shurtleff, Rte. 1, Box 19P, Enterprise, Tex. 75681

[21] Appl. No.: 09/027,295

[22] Filed: Feb. 23, 1998

[51] Int. Cl.$^7$ ..................................................... G01C 9/12
[52] U.S. Cl. ............................................... 33/391; 33/371
[58] Field of Search ............................. 33/365, 369, 370, 33/371, 391, 395, DIG. 1

[56] References Cited

U.S. PATENT DOCUMENTS

| 988,888 | 4/1911 | Meier et al. | 33/391 |
|---|---|---|---|
| 1,003,863 | 9/1911 | Arnst | 33/395 |
| 1,441,350 | 1/1923 | Herrman | 33/391 |
| 1,523,315 | 1/1925 | Tone | 33/391 |
| 2,601,643 | 6/1952 | Sulger | 33/391 |
| 2,847,765 | 8/1958 | Bateman | 33/391 |
| 4,593,475 | 6/1986 | Mayes | 33/DIG. 1 |
| 4,745,689 | 5/1988 | Hiltz | 33/DIG. 1 |
| 4,747,217 | 5/1988 | Austin | 33/391 |

FOREIGN PATENT DOCUMENTS

| 1571109 | 7/1980 | United Kingdom | 33/391 |
|---|---|---|---|

OTHER PUBLICATIONS

3–Directional Folding Precision Level (advertisement), "Popular Mechanics," p. 296, Dec. 1949.

*Primary Examiner*—G. Bradley Bennett
*Attorney, Agent, or Firm*—Don W. Weber

[57] ABSTRACT

A pendulum line level is presented which makes reading the level easier and which allows a workman to utilize a level that is calibrated in degrees. The level is essentially rectangular and has two rotating dials in the body of the level. These dials rotate freely about a pivot point. Each disc has a pair of horizontal and vertical, perpendicular pointers which are used to determine when the level is in horizontal alignment with the ground. A calibrated scale located just outside the upper left quadrant of the left disc and just outside the lower right quadrant of the right disc allows the workman to read discreet angles of orientation. A second embodiment of the device has a gate with another pair of dials which swings perpendicular to the main body of the pendulum level. This second set of perpendicular dials allows the workman to determine when the main body of the level is in a vertical plane and to determine at which angle the main body of the level may be oriented.

8 Claims, 4 Drawing Sheets

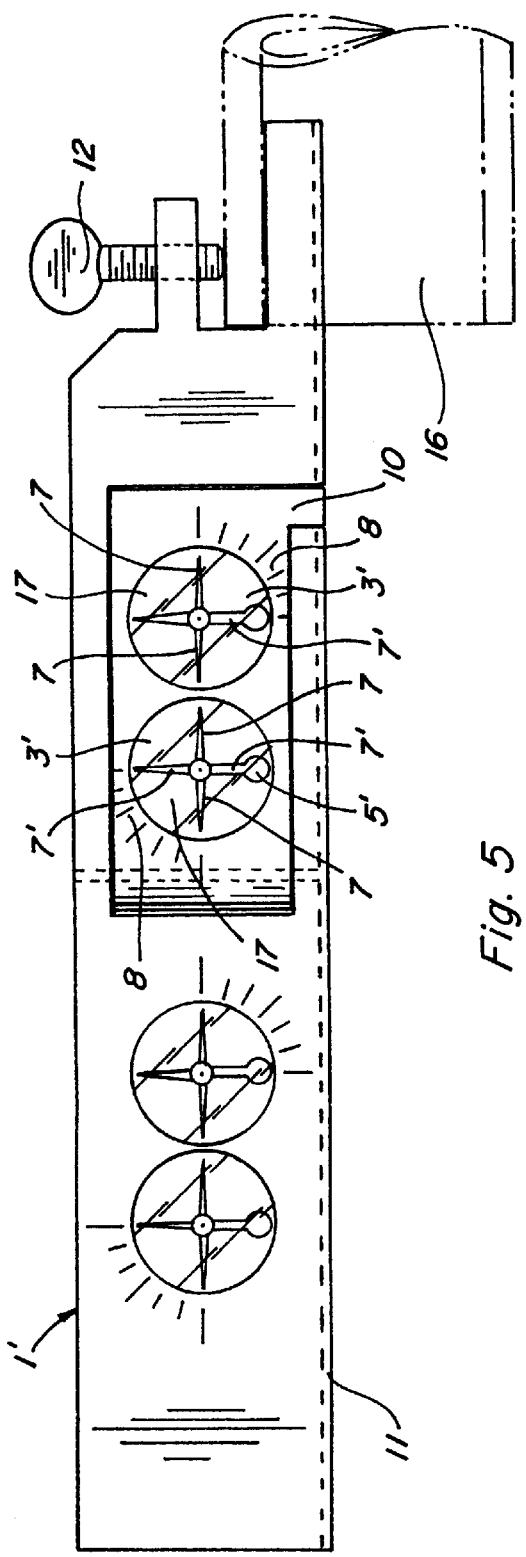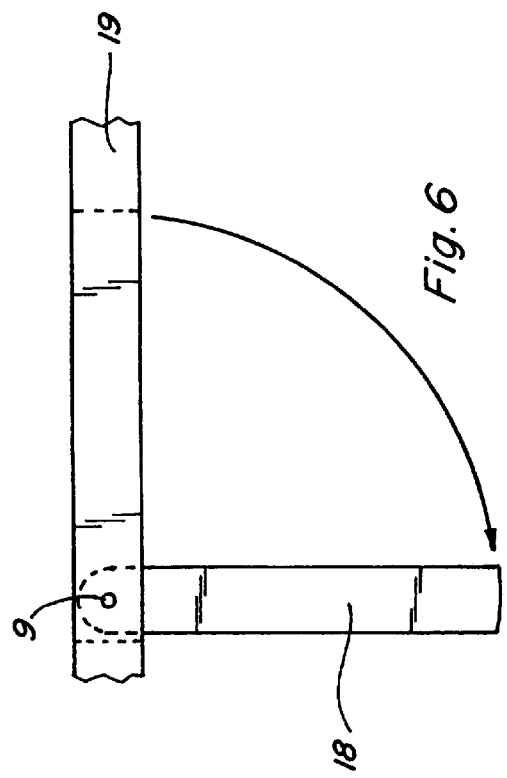

PENDULUM LINE LEVEL

BACKGROUND OF THE INVENTION

This invention relates to the field of levels for use in bending conduit and the like. More particularly, a pendulum line level is presented which uses the force of gravity acting on a rotatable disc to determine the orientation of the level to the horizontal plane.

There are many types of levels known in the workplace. The most common type of level is the bubble level, which utilizes an air bubble in liquid, encased in a vial, to determine the orientation of the level, and hence the workpiece, to the horizontal plane or other angle. One problem encountered in using a normal bubble level is that the bubble is hard to read and the level is imprecise, since it involves centering a bubble between two lines. It is an object of this invention to provide a precise and calibrated level for determining the orientation of a workpiece.

One other problem with the bubble level is that the bubble is often difficult to see, particularly when the level becomes covered with debris or other material. It is a still further object of this invention to provide a line level which is easily readable and easily viewable even under less than ideal conditions.

Bubble levels also suffer from the inherent drawback that they are unable to measure more than one angle (90 degrees, 45 degrees, 30 degrees, etc.) per one bubble vial. Therefore, it is not uncommon to find levels with a number of bubble vials spaced apart on the level in order to read different discreet angles. Even then, it is not possible for the bubble level vials to be used for non-uniform angles, such as 35 degrees or 55 degrees, without the use of many additional vials. It is a further object of this invention to provide a single level having a pair of indicator discs for reading a wide number of varied angles, between the 0 to 90 degree arc.

It is a still further object of this invention to provide a pendulum line level which is capable of allowing the workman to calibrate the relative angle of a workpiece precisely. Other and further objects of this invention will become obvious upon reading the below described Specification.

BRIEF DESCRIPTION OF THE PREFERRED EMBODIMENT

A pendulum line level is presented having an essentially rectangular body within an essentially rectangular cross-section. Near the center of one preferred embodiment are two rotating pendulum indicator discs, which pivot about a pin. These discs have both horizontal and vertical indicators. The lowest vertical indicator also has a pendulum weight attached thereto, which keeps the rotating indicator disc at a constant orientation with respect to the ground. When the pendulum line level is affixed to a pipe, either by using a thumbscrew attaching means or by using a magnetic strip attached to the bottom of the level, the angle can be read based on the orientation of an indicator to a 0 to 90 degree scale. The horizontal plane can also be determined when all four of the horizontal indicators are in a straight line.

This scale is also inscribed and marked on the face of the level and enables a workman to determine very precise angles. The configuration of the pendulum discs with respect to the scale also allows the workman to determine discreet angles, by degree, between the angles of 0 and 90 degrees.

A swing-out perpendicular set of discs is also provided to enable the workman to measure an angle perpendicular to the angle read by the discs contained in the main body of the instrument.

BRIEF DESCRIPTION OF THE DRAWINGS

FIG. 5 is a front view of a second embodiment of the pendulum line level similar to FIG. 1, however also having perpendicular disc indicators.

FIG. 6 is a partial view of the pendulum line level shown in FIG. 5, shown with the perpendicular disc indicator gate in the open position.

DETAILED DESCRIPTION OF THE PREFERRED EMBODIMENT

Figure 1:
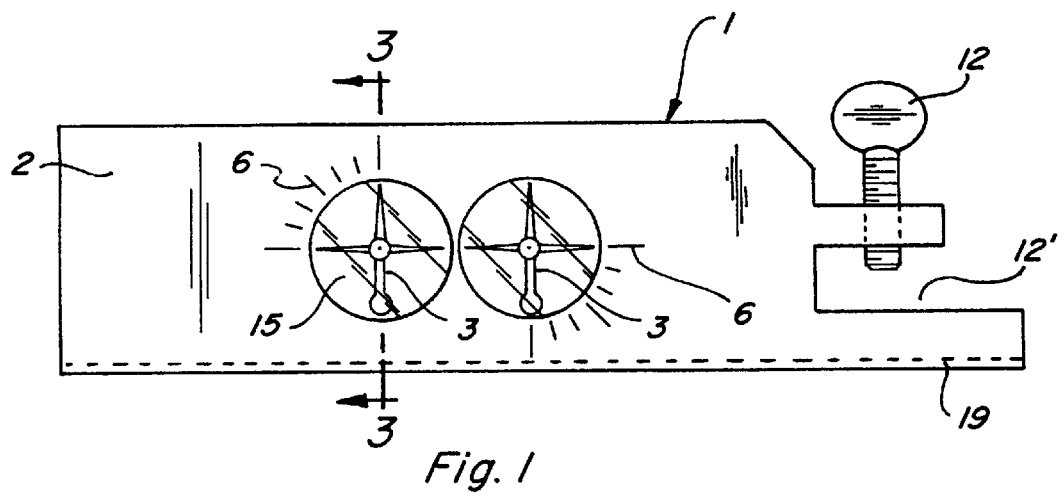
FIG. 1 is a front view of the pendulum line level showing the embodiment with two discs, and the thumbscrew and magnetic attaching means.
Figure 2:
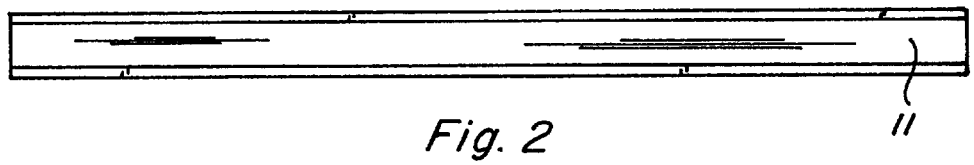
FIG. 2 is a bottom view of the pendulum line level shown in FIG. 1, showing the magnetic attaching strip.

A pendulum line level 1 is presented, comprising a main essentially rectangular body 2 with two disc indicators 3 placed near the center of the body. The pair of disc indicators act conjunctively to produce a pronounced visual indicator when the device is off-level. The body 1 also has an essentially rectangular cross-section, as shown on FIG. 3. These circular indicator discs 3 pivot within the circular indicator aperture 15 about a disc indicator pivot pin 14, as best shown on FIG. 4.

Figure 7:
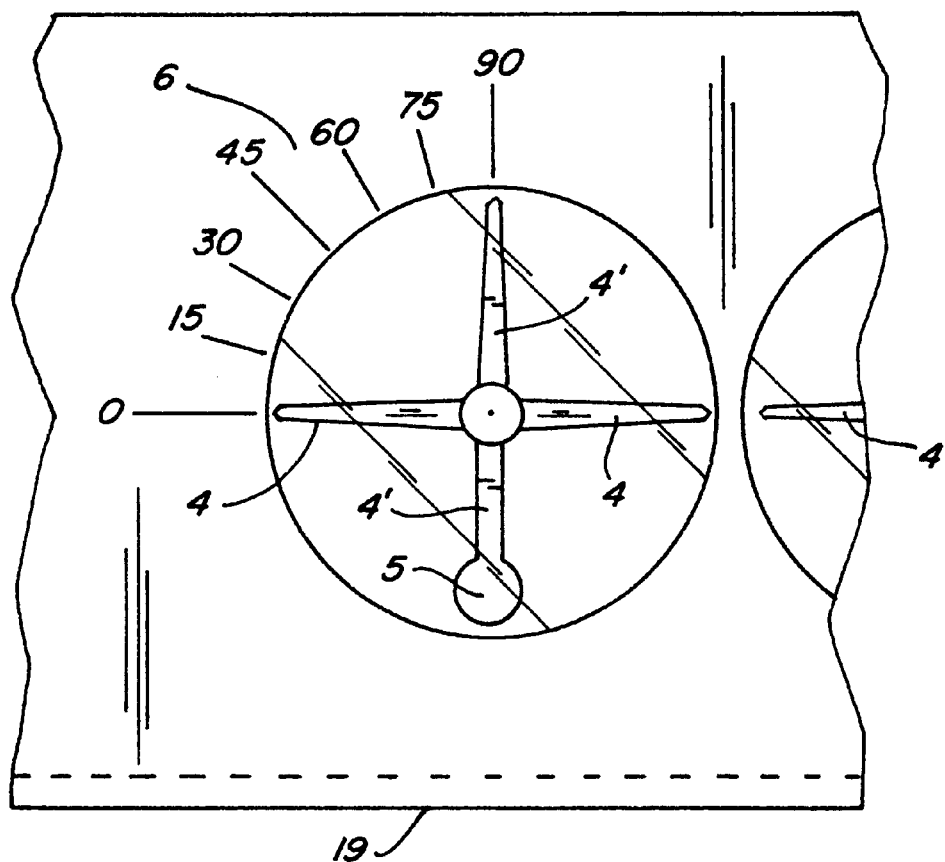
FIG. 7 is a partial enlarged view of the left disc and dial shown in FIG. 1.

Each indicator disc 3 contains on each face a pair of horizontal indicators 4 and a pair of vertical calibration indicators 4' as best shown on FIG. 7. The horizontal and vertical indicators are perpendicular to each other. The bottom vertical indicator also has an expanded weighted area 5, the pendulum weight. This pendulum weight keeps the rotating indicator discs horizontal to the ground due to the force of gravity.

A unique addition to the normal bubble levels is the indicator angle calibration scales 6 found in the upper left quadrant of the left indicator and the lower right quadrant of the right indicator, as shown on FIG. 1. These calibration scales enable the workman to read the angles indicated on the scale (as best shown on FIG. 7) and to estimate other discreet angles between the angles indicated. The horizontal 4 and vertical 4' calibration indicator arms may be quite narrow to enable very precise readings from either the indicator angle calibration scales 6 or from their horizontal alignment. The scales may be made such that any discreet angles may be read.

A second embodiment of this invention is shown in FIGS. 5 and 6. This embodiment is similar to the embodiment found in FIGS. 1 through 4, but also includes a perpendicular disc indicator gate 18. This perpendicular disc indicator gate 18 contains a second pair of perpendicular indicator discs 3'. These perpendicular indicator discs 3' have horizontal calibration indicators 7 and vertical calibration indicators 7'. Similar to the embodiment shown in FIG. 1, a pendulum weight 5' is attached at the lower end of each lower vertical indicator 7'.

Similar to the embodiment shown in FIG. 1, the perpendicular disc indicator gate 18 also has perpendicular calibration scales 8 just outside the upper left quadrant of the left disc and just outside the lower right quadrant of the right disc as shown on FIG. 5.

This perpendicular disc indicator gate 18 remains within the body of the device unless it is pivoted as shown in FIG. 6. The pivoted gate 18 enables the workman to read angles both in the main horizontal direction of the line level shown in FIG. 6 and in a direction perpendicular to the main body of the level, as shown in FIG. 6.

The perpendicular dial indicator gate 18 pivots about pivot pin 9. In addition, a perpendicular gate foot 10 is integral with the gate 18 so that the pendulum line level can remain in a flat orientation with respect to the workpiece when the gate 18 is opened as shown in FIG. 6.

In both the embodiments shown in FIG. 1 and 5, attaching means enables the workman to attach the pendulum line level to the workpiece. One attaching means is the inset magnet 11 which runs along the base of the device, shown in FIGS. 1, 2 and 5. An alternate means of attaching the line level to a conduit or other workpiece is the thumbscrew 12 and thumbscrew aperture 12', shown in FIGS. 1 and 5.

Figure 4:
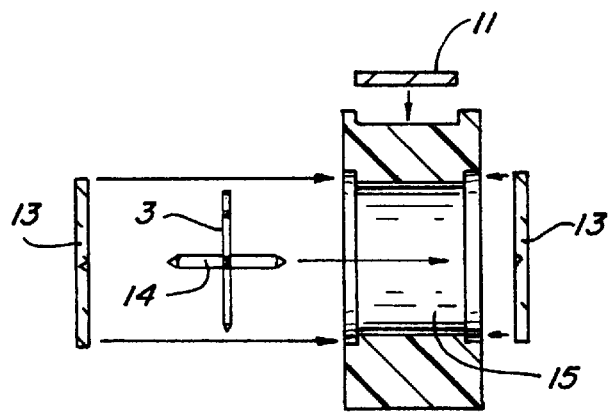
FIG. 4 is an exploded view of FIG. 3, showing the disc, disc pivot, and other aspects of the device.
Figure 3:
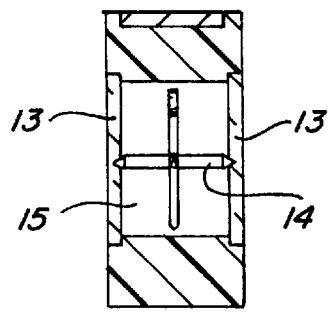
FIG. 3 is a cross section of a disc compartment taken along lines 3—3 of FIG. 1.

Turning now to FIGS. 3 and 4, the structure of the indicator level disc indicators is shown. Each indicator level disc 3 pivots about an indicator pivot pin 14. This pivot pin has opposite ends attached to an aperture face plate 13. The structure of each indicator disc, pivot pin, and horizontal and vertical indicators is similar for each disc apparatus.

As the flat base 19 of the device is moved to an angle with the horizontal, the pendulum discs 3 rotate with respect to the ground. When the flat bottom 19 of the pendulum line level device is level with the ground, as shown in FIGS. 1 and 5, the horizontal indicators 4 will be in perfect alignment. Only a slight variation of the flat bottom 19 of the level with the ground will produce a marked disruption in the horizontal line formed by horizontal line indicators 4. A workman can easily and readily discern when the level, and hence the workpiece attached to the level, is out of alignment by observing the orientation of the horizontal indicators 4.

As the flat base 19 of the device is moved to an angle with the horizontal, the vertical 4' and horizontal 4 indicators begin to rotate due to the displacement of the pendulum weight 5. This displacement causes the gap between adjacent indicators to shorten. The adjacent indicators in a right-end upper tilt are the right horizontal indicator of the left gauge and the pendulum indicator of the right gauge. Adjacent indicators in a left-end upper tilt are the left horizontal indicator of the right gauge and the pendulum indicator of the left gauge. The narrowing of this gap between the indicators is another obvious visual sign that the workpiece is not level.

Figure 8:
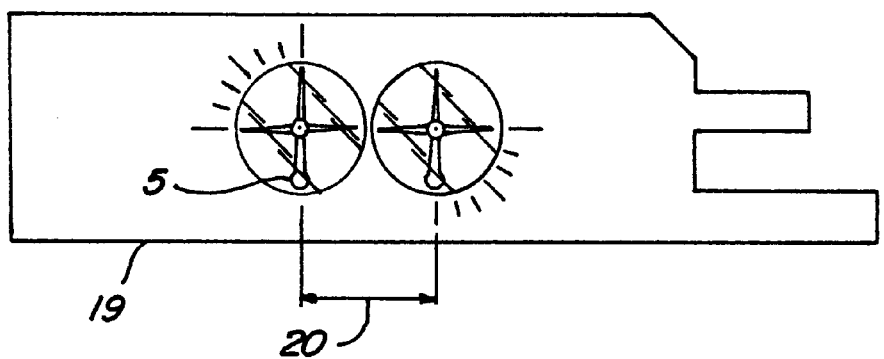
FIG. 8 is a front view of the device in the level position showing the gap between the two lower vertical pendulum indicators.
Figure 9:
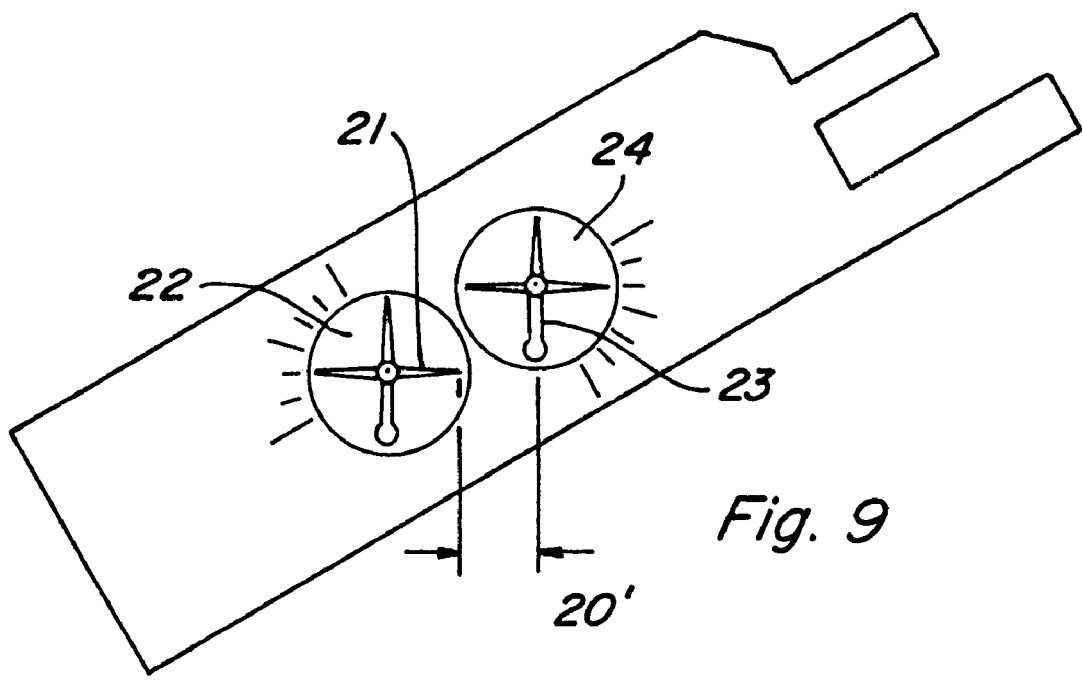
FIG. 9 is a front view of the device with its right edge tilted upward showing the narrowing of the gap between adjacent off-level indicators.
Figure 10:
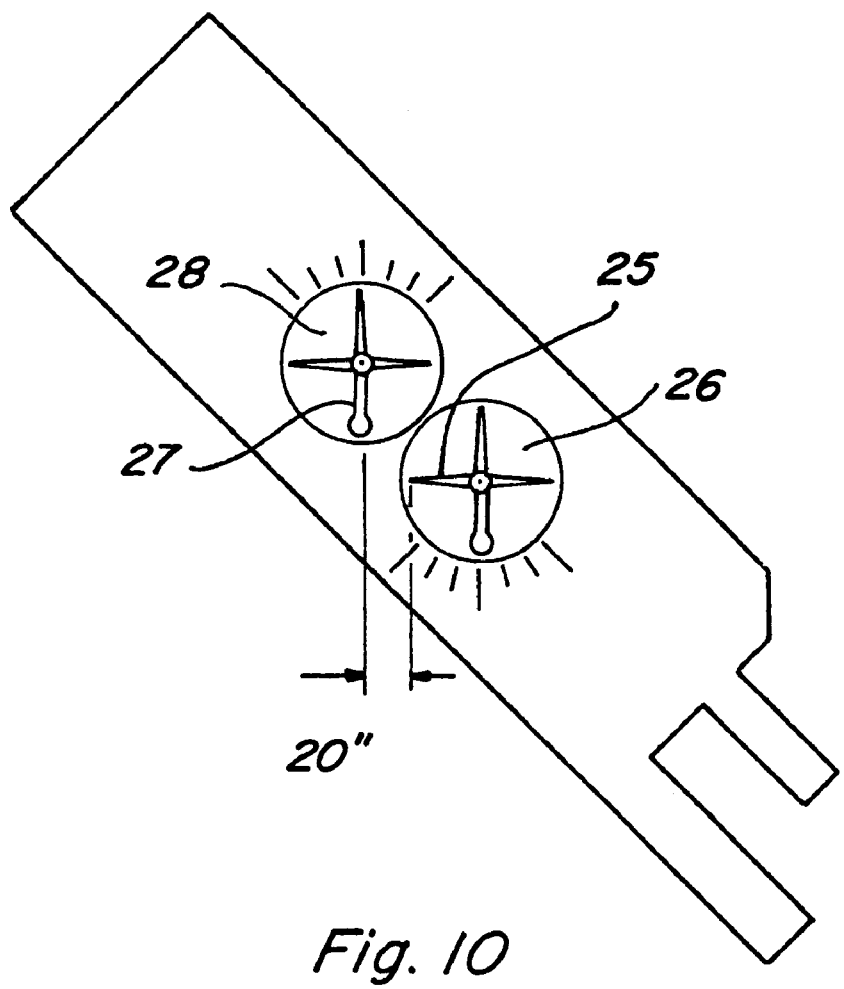
FIG. 10 is a front view of the device with the left end tilted upwards showing the narrowing of the gap between adjacent off-level indicators.

As best shown on FIGS. 8, 9, and 10, the shortening of the gap between indicators is quite obvious as the pendulum line level device and workpiece is tipped off of level.

FIG. 8 shows the pendulum device on a level surface. The level gap 20 shows the widest separation of indicators. However, when the pendulum device is tilted upwards at the right end so that it is off-level, as shown in FIG. 9, the gap 20' between the right horizontal indicator 21 of the left gauge 22 and the lower vertical pendulum indicator 23 of the right gauge 24 narrows. It is the narrowing of the gap 20' between adjacent offlevel indicators 21 and 23 that produces a pronounced and highly visible sign that the pendulum device and workpiece is off-level.

Similarly, when the workpiece and pendulum device is tilted upwards on the left, the narrowed gap between adjacent indicators produces an identical highly visible sign that the workpiece and pendulum device are off-level. In a left, upward tilt, as shown in FIG. 10, the gap 20" between the left horizontal indicator 25 of the right gauge 26 and the lower vertical pendulum indicator 27 of the left gauge 28 narrows. This narrowed gap 20" between adjacent off-level indicators produces a similarly pronounced and highly visible sign that the workpiece is off-level.

As shown in FIG. 5, the level can readily be attached to a conduit 16 or other piece of pipe by means of a thumbscrew. When attached as shown in FIG. 5, and when the conduit is precisely horizontal, the horizontal indicators 7 will be in exact horizontal, straight line alignment. When the conduit is not level, the horizontal indicators will not be in alignment and a jagged rather than a straight, continuous line will appear.

Another advantage of this device, as best illustrated in FIG. 7, is that the horizontal 7 and vertical 7' calibration indicators are capable of reading various angles between the 0 to 90 degree arc as shown. When the level is tipped such that the right end shown in FIG. 7 is higher than the right end, the left horizontal indicator 4 will read the approximate degree of angle between the flat bottom 19 of the level and the ground.

The perpendicular disc indicators 17 also allow the workman to determine when the main body of the line level 19 is not exactly perpendicular to the horizontal level of the ground. When the perpendicular disc gate 18 is at a 90 degree angle to the main body 19 of the level, the perpendicular disc indicators 17 can be read to determine whether or not the main body 19 of the level 1' is in an exact vertical orientation to the horizontal level. Similar to the dials shown in FIGS. 1 and 7, the horizontal indicators 7 would all be in a straight line alignment when the main body 19 of the level 1' is exactly vertical. Again, perpendicular calibration scales 8 enable the workman to read any angle between 0 and 90 degrees if the main body 19 of the level is not precisely vertical.

Slight variations in the construction of this device can be made while still keeping within the spirit and scope of the disclosure herein. The preferred embodiments, found in FIGS. 1 and 6, could have minor variations. For example, the scale shown in FIG. 7 could be a scale calibrated in 1 degree or ½ degree increments. In order to accomplish this, the scale itself would have to be large, while the reading indicators (either horizontal 4 or vertical 4') would have to be quite narrow. However, given a highly calibrated scale and a very thin horizontal or vertical indicator, this device could be used to read very small angles very precisely. Bubble levels are not sufficient to allow this type of calibration or to read these discreet angles. One major improvement over the prior art is the ability of this particular line level pendulum to enable the workman to read very precise angles.

The construction of the discs and vertical and horizontal indicators, as shown and described in FIGS. 3 and 4, could vary slightly while still keeping within the spirit of this invention. For example, the discs 3 could be eliminated entirely, leaving only the vertical 4 and horizontal 4' indicators to rotate about pivot pin 14 within the disc aperture 15. Furthermore, the indicators need not be actually separate from the discs but could simply be painted or inscribed on each face of the disc.

This device could come in many sizes, ranging from approximately 6 to 8 inches in length to several feet. Obviously, the larger the pendulum line level, the more accurate it can be since the scales 6 and 8 would then be quite large as compared to the smaller six inch embodiment of the device. It is within the spirit and disclosure of this device to make a pendulum line level such as the one shown and described herein in many different sizes, using varying degrees of scale calibrations depending upon the precision required for the instrument. Other minor variations can be made to the preferred embodiments described herein while still keeping within the spirit of the disclosure.

Having fully described my device, I claim:

1. A pendulum line level device for measuring the angle of orientation of a workpiece, comprising:
    (1) an essentially rectangular main body having an essentially square cross-section having a pair of left and right pivoting indicator discs located within said body;
    (2) wherein each of said left and right indicator discs has a pair of horizontal indicators and upper and lower vertical indicators, and wherein each disc is rotatably attached within said main body, and wherein said lower vertical indicator has a pendulum weight located at its bottom, wherein when said pendulum line level device is tilted to an off-level orientation, the gap between adjacent off-level indicators narrows, thereby producing a pronounced and highly visible sign that the pendulum device and workpiece are off level;
    (3) calibrated scales located just outside the upper left quadrant of the left indicator disc and just outside the lower right quadrant of the right indicator disc; and
    (4) an attaching means for attaching the pendulum level to the workpiece.

2. A pendulum line level for measuring the angle of orientation of a workpiece as in claim 1, wherein said calibrated scales are calibrated in discrete degrees of arc.

3. A pendulum line level for measuring the angle of orientation of a workpiece as in claim 1, wherein said attaching means comprises a magnet attached along the flat bottom length of said level.

4. A pendulum line level for measuring the angle of orientation of a workpiece as in claim 1, wherein said attaching means comprises an aperture and a thumbscrew.

5. A pendulum line level device for measuring the angle of orientation of a workpiece comprising:
    (1) an essentially rectangular main body having an essentially square cross-section having a first pair of pivoting indicator discs located within said body;
    (2) wherein each of said left and right indicator discs has a pair of horizontal indicators and upper and lower vertical indicators, and wherein each of said discs is rotatably attached within said main body, and wherein said lower vertical indicator has a pendulum weight located at its bottom, wherein when said pendulum line level device is tilted to an off-level orientation, the gap between adjacent off-level indicators narrows, thereby producing a pronounced and highly visible sign that the pendulum device and workpiece are off level;
    (3) a first pair of calibrated scales, one scale located just outside the upper left quadrant of the left indicator disc and a second scale located just outside the lower right quadrant of the right indicator disc;
    (4) an attaching means for attaching the pendulum level to the workpiece;
    (5) a pivotable perpendicular indicator gate attached to said main body having a second pair of left and right indicator discs located within said gate identical to said first pair of discs, wherein said gate may be pivoted at a 90 degree angle to said main body, wherein when said second pair of left and right indicator discs is tilted to an off-level orientation, the gap between adjacent off-level indicators of said second pair of discs narrows, thereby producing a pronounced and highly visible sign that the pendulum device and workpiece are off level;
    (6) a second pair of calibrated scales identical to the scales on said main body, one scale located just outside the upper left quadrant of said second left disc and a second scale located just outside the lower right quadrant of said second right disc;
    whereby the angle between the main body and vertical may be determined and measured.

6. A pendulum line level for measuring the angle of orientation of a workpiece, as in claim 5, wherein said second pair of calibrated scales are calibrated in discrete angles or arc.

7. A pendulum line level for measuring the angle of orientation of a workpiece, as in claim 5, wherein said attaching means comprises a magnet attached along the flat bottom length of said level.

8. A pendulum line level for measuring the angle of orientation of a workpiece as in claim 5, wherein said attaching means comprises an aperture and a thumbscrew.

* * * * *